(12) United States Patent
Moyer

(10) Patent No.: US 6,920,586 B1
(45) Date of Patent: Jul. 19, 2005

(54) REAL-TIME DEBUG SUPPORT FOR A DMA DEVICE AND METHOD THEREOF

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 10/764,110

(22) Filed: Jan. 23, 2004

(51) Int. Cl.[7] .............................................. G06F 11/00
(52) U.S. Cl. ......................................... 714/43; 710/22
(58) Field of Search ............................ 714/43, 31, 32, 714/39, 27, 9, 44, 47, 37, 29, 51; 710/22, 23, 28; 709/229, 230, 206, 207

(56) References Cited

U.S. PATENT DOCUMENTS

| | | | |
|---|---|---|---|
| 4,688,166 A | | 8/1987 | Schneider |
| 5,487,149 A | * | 1/1996 | Sung ............................ 714/10 |
| 6,065,037 A | * | 5/2000 | Hitz et al. ................... 709/200 |
| 6,145,007 A | * | 11/2000 | Dokic et al. ................ 709/230 |
| 6,145,122 A | | 11/2000 | Miller et al. |
| 6,470,071 B1 | | 10/2002 | Baertsch et al. |
| 6,615,370 B1 | * | 9/2003 | Edwards et al. ............... 714/45 |
| 6,754,846 B2 | * | 6/2004 | Rasmussen et al. .......... 714/11 |
| 6,816,924 B2 | * | 11/2004 | Hagen ......................... 710/28 |
| 2002/0169867 A1 | * | 11/2002 | Mann et al. ................. 709/224 |
| 2002/0174207 A1 | * | 11/2002 | Battou ......................... 709/223 |
| 2002/0178396 A1 | * | 11/2002 | Wong et al. .................... 714/4 |
| 2003/0154430 A1 | | 8/2003 | Allen et al. |

FOREIGN PATENT DOCUMENTS

| | | |
|---|---|---|
| WO | WO 03/034225 | 4/2003 |

* cited by examiner

*Primary Examiner*—Nadeem Iqbal
(74) *Attorney, Agent, or Firm*—Robert L. King

(57) ABSTRACT

A data processing system (10) has a debug module (26) that selectively generates one or more debug messages that are specific to a Direct Memory Access (DMA) controller device (16) in the system. A control register(70) enables which of the DMA debug messages are provided. The beginning and end of DMA transfer activity is provided including when minor loop iterations start and complete. Latency information indicating system latency between a channel request and actual initiation of the request for each DMA transfer may also be included in a debug message. One of the debug messages provides periodic status of a predetermined DMA channel under control of a control register (80). At least one of the debug messages implements a watchpoint function, such as indicating when a transfer starts or ends. The debug module may be centralized in the system or distributed among each of predetermined system units.

17 Claims, 5 Drawing Sheets

| (8-64 BITS) | (8-64 BITS) | (1-8 BITS) | (4-8 BITS) | (6 BITS) |
|---|---|---|---|---|
| TRANSFER SERVICE LATENCY (OPTIONAL) | TRANSFER COUNT (OPTIONAL) | CHANNEL STATUS | CHANNEL ID. | TCODE (110111) |

FIG. 4

| (8-64 BITS) | (8-64 BITS) | (1-8 BITS) | (4-8 BITS) | (6 BITS) |
|---|---|---|---|---|
| TRANSFER SERVICE LATENCY (OPTIONAL) | TRANSFER COUNT (OPTIONAL) | CHANNEL STATUS | CHANNEL ID. | TCODE (111000) |

FIG. 5

| (8-64 BITS) | (8-64 BITS) | (1-8 BITS) | (4-8 BITS) | (6 BITS) |
|---|---|---|---|---|
| ITERATION INTERVAL (OPTIONAL) | ITERATION COUNT (OPTIONAL) | CHANNEL STATUS | CHANNEL ID. | TCODE (111001) |

FIG. 6

| (8-64 BITS) | (8-64 BITS) | (1-8 BITS) | (4-8 BITS) | (6 BITS) |
|---|---|---|---|---|
| TRANSFER INTERVAL (OPTIONAL) | TRANSFER COUNT (OPTIONAL) | CHANNEL STATUS | CHANNEL ID. | TCODE (111010) |

FIG. 7

| (8-64 BITS) | (1-8 BITS) | (4-8 BITS) | (6 BITS) |
|---|---|---|---|
| CURRENT TRANSFER COUNT (OPTIONAL) | CHANNEL STATUS | CHANNEL ID. | TCODE (111011) |

*FIG. 8*

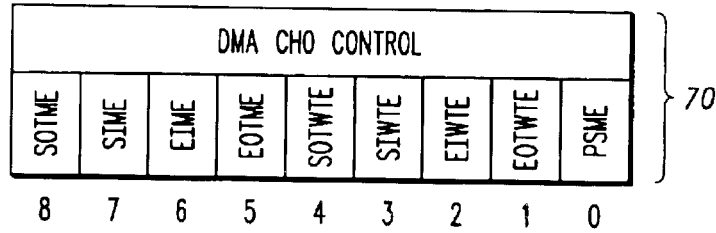

SOTME - START OF TRANSFER MESSAGE ENABLE (CHx)
 0 = START OF TRANSFER MESSAGING IS DISABLED
 1 = START OF TRANSFER MESSAGING IS ENABLED

SIME - START OF ITERATION MESSAGE ENABLE (CHx)
 0 = START OF ITERATION MESSAGING IS DISABLED
 1 = START OF ITERATION MESSAGING IS ENABLED

EIME - END OF ITERATION MESSAGE ENABLE (CHx)
 0 = END OF ITERATION MESSAGING IS DISABLED
 1 = END OF ITERATION MESSAGING IS ENABLED

EOTME - END OF TRANSFER MESSAGE ENABLE (CHx)
 0 = END OF TRANSFER MESSAGING IS DISABLED
 1 = END OF TRANSFER MESSAGING IS ENABLED

SOTWTE - START OF TRANSFER WATCHPOINT TRIGGER ENABLE (CHx)
 0 = START OF TRANSFER WATCHPOINT TRIGGERING IS DISABLED
 1 = START OF TRANSFER WATCHPOINT TRIGGERING IS ENABLED

SIWTE - START OF ITERATION WATCHPOINT TRIGGER ENABLE (CHx)
 0 = START OF ITERATION WATCHPOINT TRIGGERING IS DISABLED
 1 = START OF ITERATION WATCHPOINT TRIGGERING IS ENABLED

EIWTE - END OF ITERATION WATCHPOINT TRIGGERING ENABLE (CHx)
 0 = END OF ITERATION WATCHPOINT TRIGGERING IS DISABLED
 1 = END OF ITERATION WATCHPOINT TRIGGERING IS ENABLED

EOTWTE - END OF TRANSFER WATCHPOINT TRIGGERING ENABLE (CHx)
 0 = END OF TRANSFER WATCHPOINT TRIGGERING IS DISABLED
 1 = END OF TRANSFER WATCHPOINT TRIGGERING IS ENABLED

PSME - PERIODIC STATUS MESSAGE ENABLE (CHx)
 0 = PERIODIC STATUS MESSAGING IS DISABLED
 1 = PERIODIC STATUS MESSAGING IS ENABLED

*FIG. 9*

REAL-TIME DEBUG SUPPORT FOR A DMA DEVICE AND METHOD THEREOF

FIELD OF THE INVENTION

The present invention relates to a data processing system, and more particularly, to test and debug features in a data processing system.

RELATED ART

Data processing systems have one or more buses that function as a communication highway for the system. The one or more buses function to transfer address, data and/or control information during time periods defined by clock cycles. It is well documented in the literature to apply various techniques to test the functionality of the circuitry within a data processing system and to check and verify the functionality of executing software, known as software program debugging. A critical component in test methodologies is to obtain external visibility for portions of a data processing system, such as the contents of registers and the results of system operation. Test and debug equipment external to a data processing system is used to monitor values of address, data and control information being transferred by the system's bus or buses.

Typical data processing systems use a technique known as a direct memory access (DMA). Using direct memory access, information can be directly transferred between input/output devices and a memory with only minimal involvement by a central processing unit (CPU). Thus a DMA controller functions to transfer a stream of information from a source in a data processing system to a destination.

System-on-a-chip (SOC) designs are typically composed of multiple devices and buses that are capable of generating debug messages using real-time techniques. For example, an IEEE standard known is IEEE ISTO5001, or the Nexus debug standard, is an established real-time debug standard that supports real-time debug message generation by multiple on-chip devices. The Nexus debug standard specifies a mechanism for identifying to an external trace reconstruction tool a predetermined operating condition within the system. However, this debug information is typically limited to the monitoring of information that is read or written to a system memory and to the tracking of changes of execution flow of software being executed such as a number of sequential instructions executed since a last taken branch. The present debug processor capability provides a very limited amount of information regarding DMA activity.

BRIEF DESCRIPTION OF THE DRAWINGS

The present invention is illustrated by way of example and not limited by the accompanying figures, in which like references indicate similar elements, and in which:

FIG. 4 illustrates in diagrammatic form a format of a first transfer message;

FIG. 5 illustrates in diagrammatic form a format of a second transfer message;

FIG. 6 illustrates in diagrammatic form a format of a third transfer message;

FIG. 7 illustrates in diagrammatic form a format of a fourth transfer message;

FIG. 8 illustrates in diagrammatic form a format of a fifth transfer message;

FIG. 9 illustrates in layout form a control register for DMA messaging; and

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The terms "assert" and "negate" are used when referring to the rendering of a signal, bit, or similar apparatus into its logically true or logically false state, respectively. If the logically true state is a logic level one, the logically false state is a logic level zero. Furthermore, the memory described herein may be any type of memory, such as, for example, a read-only memory (ROM), a random access memory (RAM), static random access memory (SRAM), non-volatile memory (e.g. Flash), and MRAM, etc.

Figure 1:
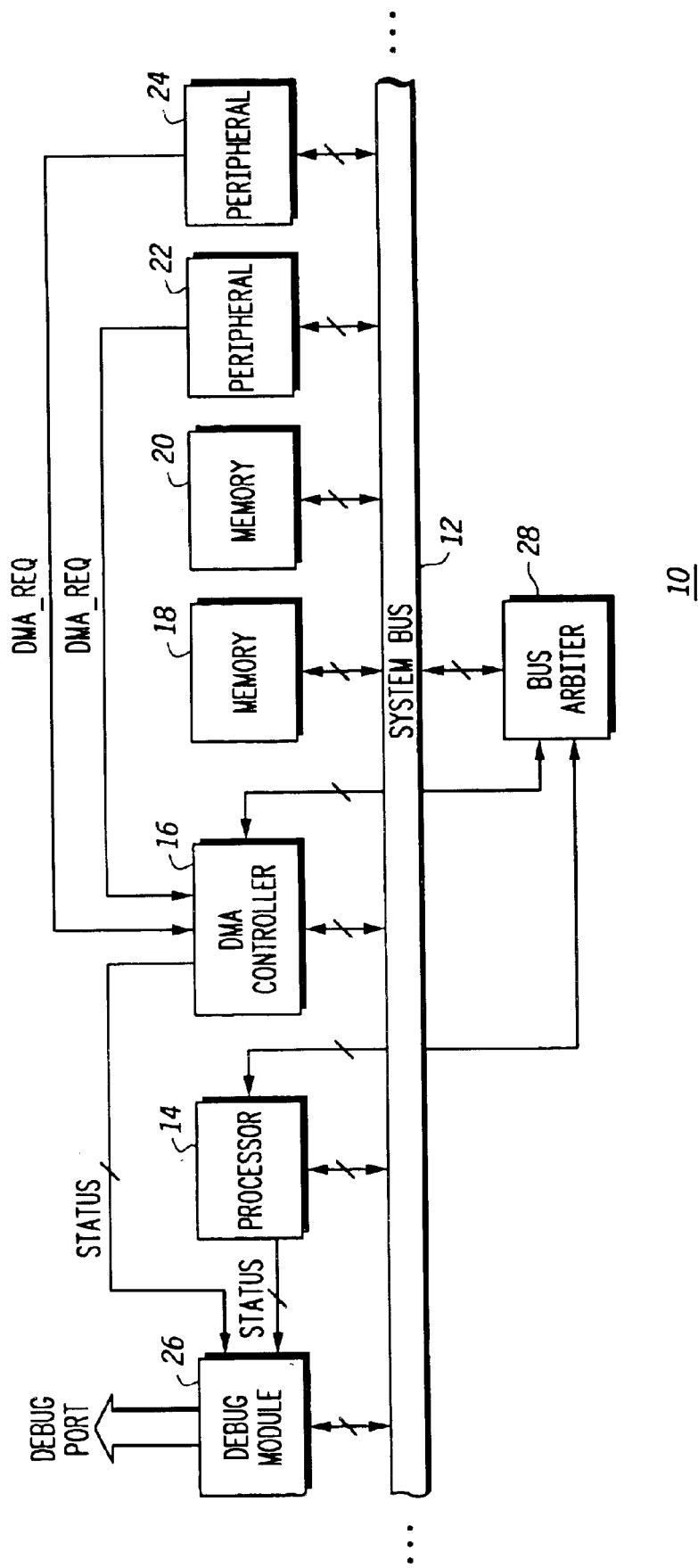
FIG. 1 illustrates in block diagram form a data processing system in accordance with one embodiment of the present invention.

FIG. 1 illustrates, in block diagram form, a data processing system 10 that provides real-time DMA-specific debug functionality. Data processing system 10 permits a class of real-time debug message types that are specific to DMA bus masters and which indicate critical status parameters. Data processing system 10 therefore provides an improved source of debug information via real-time messages for DMA units.

In one form, a multi-conductor system bus 12 is provided for communicating between all system devices. A processor 14 is bidirectionally connected to the system bus 12. While bidirectional buses described herein are indicated by hash mark to be multiple conductor buses, it should also be readily understood that single conductor buses and/or multiple unidirectional buses may also be implemented. Also bidirectionally connected to system bus 12 is a DMA controller device 16, a memory 18, a memory 20, a peripheral 22, a peripheral 24, a debug module 26 and a bus arbiter 28. Debug module 26 provides at an output thereof a debug port for providing debug information. Each of the DMA controller device 16 and the processor 14 has an output for providing a multiple bit status signal to debug module 26. Each of processor 14 and DMA controller device 16 respectively has a multiple bit bidirectional bus coupled to the bus arbiter 28. An output of peripheral 22 is connected to DMA controller device 16 for providing a DMA request signal labeled DMA_REQ. Similarly, an output of peripheral 24 is connected to DMA controller device 16 for providing a DMA request signal labeled DMA_REQ. While the systems units described herein are illustrated in FIG. 1 as being directly connected to the system bus 12, it should be understood that coupling circuitry (not shown), such as drivers, buffers, etc. may be between the system bus 12 and the illustrated system units.

In operation, data processing system 10 executes a predetermined instruction set using processor 14. Information is stored in one of memory 18 or memory 20. It should be understood that only one memory or any other number of memories may be implemented and connected to system bus 12. DMA controller device 16 functions to control the transfer of a stream of information from a source within the data processing system 10 to a destination within the data processing system 10. The information within data processing system 10 is communicated within a channel which is a stream associated between a source and a destination. Peripherals within data processing system 10 such as peripheral 22 or peripheral 24 may be any of a variety of circuit devices, but typically will function as slaves to system bus 12 by not requesting bus arbiter 28 for control of the system bus 12. Regardless of the type of device the peripherals are, the peripherals form part of the system memory mapping. Bus arbiter 28 functions to arbitrate control of system bus 12 between any devices within data processing system 10 that request control of system bus 12. Any of numerous conventional arbitration algorithms may be used to implement data processing system 10. Debug module 26 functions to provide one or more real-time debug messages associated with the DMA controller device 16 as described below. In other words, debug module 26 monitors the DMA controller device 16 by receiving status signals from both the DMA controller device 16 and processor 14 and generates real-time debug messages as described below for output to the debug port.

Figure 2:
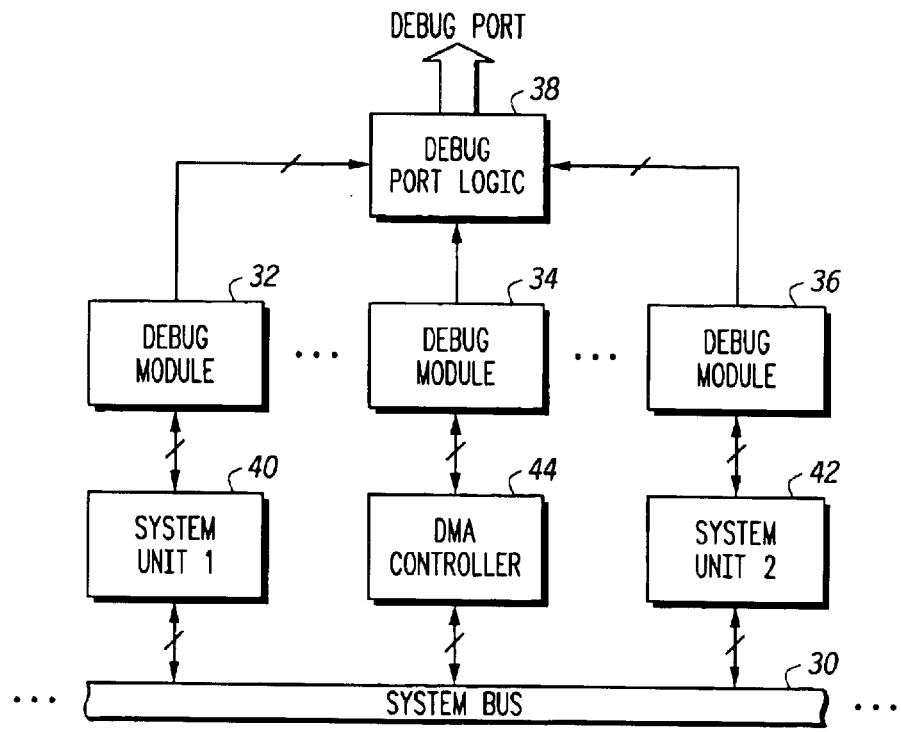
FIG. 2 illustrates in block diagram form an alternative data processing system in accordance with the present invention.

Illustrated in FIG. 2 is an alternative embodiment of the configuration of data processing system 10 of FIG. 1. A system bus 30 is bidirectionally connected to a DMA controller 44 and to a predetermined number of other system units such as system unit 40 and system unit 42. System unit 40 and system unit 42 may be any type of bus master or bus slave. Each of system unit 40, DMA controller 44 and system unit 42 is respectively bidirectionally coupled to a debug module 32, a debug module 34 and a debug module 36. An output of each of debug module 32, debug module 34 and debug module 36 is connected to debug port logic 38. The debug port logic 38 provides a debug port for providing real-time debug messages. As indicated by the dotted lines in FIG. 2, any number of debug modules and system units may be coupled between the system bus 30 and the debug port logic 38.

In an alternative form, the functionality of a debug module is divided in a manner to assign a debug module for each system unit that is coupled to system bus 30, including the DMA controller 44. The debug port logic 38 receives messages from each of debug module 32, debug module 34 and debug module 36 and provides the messages at the debug port logic. In one form, the logic of debug port logic 38 is configured to provide debug messages on a time sequential basis in which the messages are output in the order in which they are received from the various debug modules. However, other logic configurations may be used to implement other ordering of the debug outputs.

Figure 3:
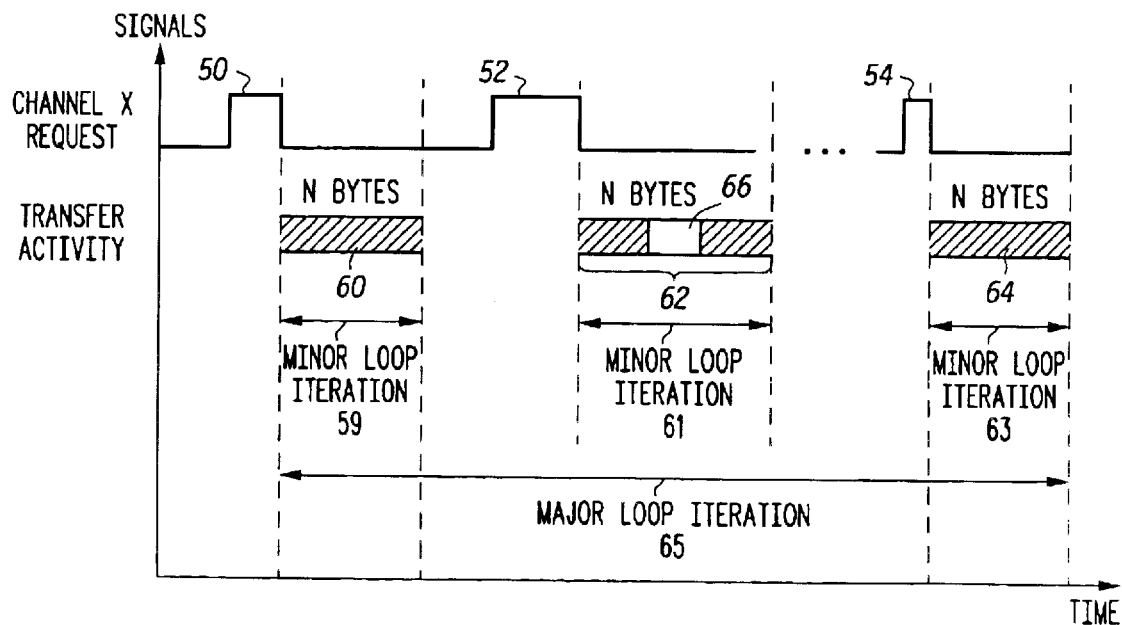
FIG. 3 illustrates in timing diagram form information transfers of a channel as a function of time.

Illustrated in FIG. 3 is a timing diagram that illustrates transfer activity on a channel, designated as channel X, within either system embodiment of FIG. 1 or FIG. 2. Assume that channel X is a predetermined illustrative data stream within either system embodiment associated with a source and a destination. Each of DMA controller device 16 and DMA controller 44 is configured to support multiple channels for transferring streams of information from sources to destinations. Transfers within a channel are generated upon receiving a DMA request signal, such as DMA_REQ, from either a source or a destination device. In the FIG. 3 example, there are three separate requests illustrated. Each request has a latency associated therewith such as latency 50 associated with the first request, latency 52 associated with the second request and latency 54 associated with the third request. The length of each latency differs due to several system factors, such as the current priority of the DMA controller device 16, as determined by bus arbiter 28, and the priority of the channel X, as determined by operation of the DMA controller device 16. This latency is a system characteristic that is desired to be known external to the system and without interrupting the system.

The transfer of streams of information continues until a certain number of bytes of data have been transferred per request. In the illustrated form of FIG. 3, assume that each of DMA controller device 16 and DMA controller 44 transfers N bytes of information, where N is an integer, per request. For example, transfer 60, transfer 62 and transfer 64 occur in response to three separate and sequential channel requests. It should be noted that a transfer may be interrupted, such as interrupt period 66 associated with transfer 62. The interrupt period 66 may result from a number of system factors, such as a change in bus mastership as determined by bus arbiter 28. Each transfer of N bytes is referred to as either an "iteration" or a "minor loop iteration". A number of minor loop iterations are executed within a "major loop iteration". It should be noted that the use of the term 'iteration' does not imply or require a repetition of the same minor loop or major loop transfer. Rather, iteration in this context refers to the fact that for any channel, such as channel X of FIG. 3, transfer activity is common and therefore multiple successive transfers occur. In the FIG. 3 example there are three minor loop iterations, minor loop iteration 59, minor loop iteration 61 and minor loop iteration 63, within major loop iteration 65. The described channel operation therefore may be considered to be a two-deep nested transfer operation where the two levels of nesting are major loops and minor loops. It should be understood that any number of minor loop iterations may exist as noted by the dotted break in the channel request signal. After completion of a minor loop iteration, control of the system bus 12 may be transferred to a higher priority channel having a pending request. Alternatively a triggering event may be generated to trigger another channel to begin a minor loop iteration. Control of the system bus 12 may also be transferred at the end of a major loop iteration.

In order to optimize overall system operation, external visibility of various aspects of the DMA activity as the system executes is very important. Therefore, there is provided herein a set of real-time trace messages related to DMA activity.

Illustrated in FIG. 4 is a first real-time DMA controller message that identifies a start of a first transfer, such as the first transfer of major loop iteration 65 of FIG. 3. The first transfer message is illustrated having five fields with two of the fields being optional. A first field is identified as a Type code (TCODE) field that identifies the type or function of the message. By way of example only, the six bit TCODE value of 110111 is selected to identify the message as a "start of a first transfer" message. A second field is a channel identification (Channel ID) field that, in one form, is from four to eight bits in length and informs what channel or type of channel the message is associated with. A third field is a channel status field and may be anywhere from one to eight bits in length, by way of example only. Examples of channel status include the priority of the channel at the beginning of the first transfer, a utilization factor (i.e. percent of utilization) of the channel, whether a transfer error for the channel has previously occurred, and numerous other status or informative detail. A fourth field that is optional is a transfer count that signifies how much information the channel will transfer. This field may contain transfer count information for each minor loop iteration associated with the channel and/or may contain transfer count information for a major loop iteration associated with the channel. As an example only, the transfer count field may be from eight to sixty-four bits in length, but other bit lengths may be used. A fifth field that is also optional is a transfer service latency. The transfer service latency identifies how long in time from the initial channel request it takes to begin transfer activity. In other words, the value in this field is an interrupt latency associated with a first transfer, such as latency 50. The value in this field may be measured by using a counter (not shown) that may be in the debug module 26 or elsewhere to count the time period associated with latency 50. In one form, the transfer service latency field may be from eight to sixty-four bits in length, but other bit lengths may be used.

Illustrated in FIG. 5 is a second real-time DMA controller message that identifies a start of a minor loop iteration, such as any of minor loop iterations 59, 61 and 63 of FIG. 3. This second transfer message is illustrated having five fields with two of the fields being optional. A first field is the Type code (TCODE) field that identifies the message as a 'start of minor loop iteration' message. For exemplary purposes only, the Type code is illustrated as 111000 but other values and bit lengths may be used. A second field is a channel identification (ID.) field that identifies the channel associated with the start of the minor loop iteration. A third field is a channel status field that identifies a status parameter or parameters of the channel, such as the status information described above for the first message. A fourth field is a transfer count for identifying how much information the channel will transfer as described above for the transfer count field of the first message. A fifth field is a transfer service latency field that identifies the latency, such as latency 50, latency 52 or latency 54. Again, the bit lengths that are provided for each field are by way of example only.

Illustrated in FIG. 6 is a third real-time DMA controller message that identifies an end of a minor loop iteration, such as any of minor loop iterations 59, 61 and 63 of FIG. 3. This third transfer message is illustrated having five fields with two of the fields being optional. A first field is the Type code (TCODE) field that identifies the message as an 'end of minor loop iteration' message. For exemplary purposes only, the Type code is illustrated as 111001 but other values and bit lengths may be used. A second field is a channel identification (ID.) field that identifies the channel associated with the end of the minor loop iteration. A third field is a channel status field that identifies a status parameter or parameters of the channel, such as the status information described above for the first message. A fourth field is an iteration count for identifying which minor loop iteration is presently being transferred on the system bus. A fifth field is an iteration interval which is a count value of how long in time the minor loop iteration lasted. A counter (not shown) located anywhere in the system may be used, but preferably the counter is within the debug module or in close proximity thereto. Again, the bit lengths (hat are provided for each field are by way of example only. Debug module 26 may also be configured so that the third transfer message may be generated even though an entire minor loop does not fully complete normally due to a transfer error.

Illustrated in FIG. 7 is a fourth real-time DMA controller message that identifies completion of a major loop iteration, such as major loop iteration 65 of FIG. 3. This fourth transfer message is illustrated having five fields with two of the fields being optional. A first field is the Type code (TCODE) field that identifies the message as an 'end of a major loop iteration' message. For exemplary purposes only, the Type code is illustrated as 111010 but other values and bit lengths may be used. A second field is a channel identification (ID.) field that identifies the channel associated with the end of the major loop iteration. A third field is a channel status field that identifies a status parameter or parameters of the channel, such as the status information described above for the first message. A fourth field is a transfer count for identifying how much information the channel has transferred as described above for the transfer count field of the first message. A fifth field is a transfer interval field which is a count value of how long in time the major loop iteration lasted. A counter (not shown) located anywhere in the system may be used, but preferably the counter is within the debug module 26 or in close proximity thereto. Again, the bit lengths that are provided for each field are by way of example only. Debug module 26 may also be configured so that the fourth transfer message may be generated even though an entire major loop does not fully complete normally due to a transfer error.

Illustrated in FIG. 8 is a fifth real-time DMA controller message that provides the status of an identified channel on a periodic basis. This periodic messaging functions to provide one or more status criteria of the identified channel. This fifth transfer message is illustrated having four fields with one of the fields being optional. A first field is the Type code (TCODE) field that identifies the message as a 'periodic status' message. For exemplary purposes only, the Type code is illustrated as 111011 but other values and bit lengths may be used. A second field is a channel identification (ID.) field that identifies the channel associated with the status information being provided. A third field is a channel status field that identifies a status parameter or parameters of the channel, such as the status information described above in connection with the discussion of the first message. A fourth field is a current transfer count for identifying how far the current transfer has progressed at the point in time that the status relates to. Again, the bit lengths that are provided for each field are by way of example only. Periodic status messages may be used to determine the relative progress of channels in the system and to allow for modification of channel priorities and bus master priorities of the DMA channels. In order for periodic status messages to be generated, the function is enabled by programmable control of a register to be described below. When the function is enabled, the timing of when the periodic status messages are provided is implementation specific. Periodic status messages may be generated whenever a predetermined or predefined number of system clock or bus cycles have occurred. Alternatively, periodic status messages may be generated on a fixed period as determined by specific hardware wiring in the system.

Illustrated in FIG. 9 is a control register 70 for one DMA channel. Control register 70 has, in exemplary form only, five bits that enable or disable eight five DMA real-time messages, and four bits that enable or disable generation of watchpoint triggers. In one form, control registers for various DMA channels, each being similar to control register 70, are provided and located within the debug module 26. Control register 70 is for a DMA channel designated as channel "CH0". A description of the control bit functions for any channel, designated as channel x, CHx, is immediately below control register 70. A first bit, bit 0, of control register 70 enables the periodic status message function. When bit 0 has a logic one value asserted, debug module 26 will generate periodic status messages having the format as illustrated in FIG. 8. In a similar manner, bits five, six, seven and eight of control register 70 enable or disable the messages of FIGS. 7, 6, 5 and 4 respectively. In addition to the DMA messages of FIGS. 4–8, control register 70 functions to enable the triggering of watchpoints for analysis external to data processing system 10. As used herein, the term "watchpoint" refers to the monitoring of a predetermined internal system event and the signaling or indication when such internal system event occurs. Bits 1, 2, 3 and 4 of control register 70 are associated with the enabling of watchpoint functions. When these watchpoints are enabled, an indication is provided by debug module 26 to the debug port that the associated function occurred, as opposed to indicating when in time the event occurred. For example, the SOTWTE bit enables the function of determining the start of a transfer in the associated channel and asserting a signal or providing a message at the debug port if the transfer occurs. The other watchpoint bits provided in FIG. 9 function to indicate that a start of an iteration (either minor loop or major loop can be defined) has occurred (bit 3), that an end of an iteration (either minor loop or major loop) has occurred (bit 2), and that an end of a transfer (either minor loop or major loop) has occurred (bit 1). The selective use of the watchpoint functions can be used to enable other debug functions. For example, an "End of Transfer" watchpoint may be used within data processing system 10 to trigger other debug functionality associated with system unit 40, system unit 42, processor 14 or any other desired function within data processing system 10. The functionality of control register 70 may be expanded or reduced from that illustrated in FIG. 9 depending upon a desired application requirement. Control register 70 may also be located in other areas of data processing system 10 than within debug module 26.

Figure 10:
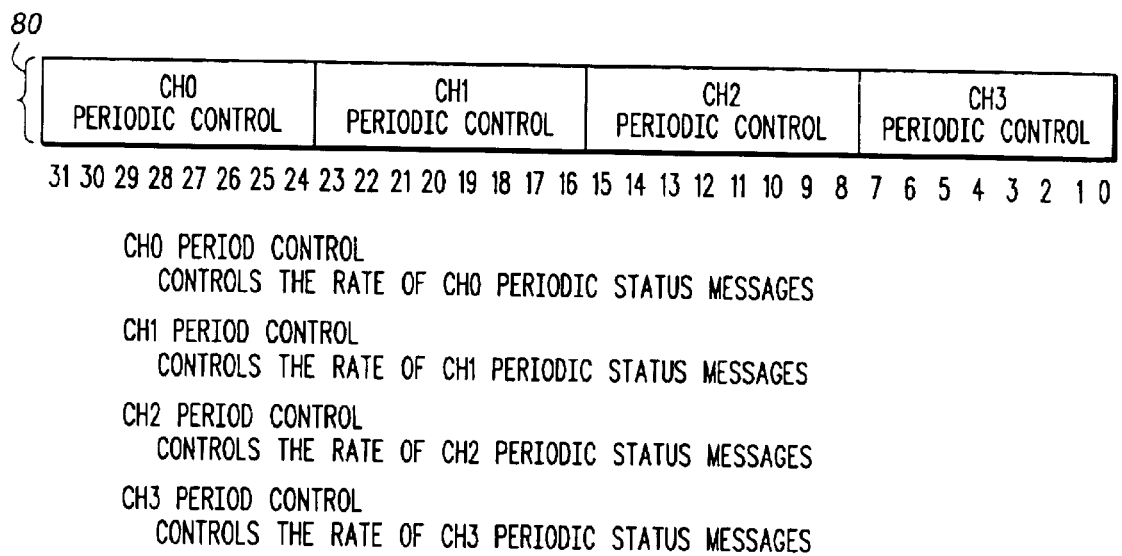
FIG. 10 illustrates in layout form a control register for periodic status messaging.

Illustrated in FIG. 10 is a periodic status messaging control register 80 having fields for each of a desired number of channels of the DMA controller device 16. In the illustrated form four channels are provided and thirty-two bits assigned, but any number of channels and bits may be used. In the first channel field, designated CH0, the digital value stored therein controls the rate that periodic status messages are generated by debug module 26. Therefore, the periodic status messaging control register 80 functions to permit a programmable and independent reporting rate for each channel to be created.

By now it should be appreciated that there has been provided a real-time debug support method and structure that provides information in the form of messages that is specific to DMA operating parameters. Included within the DMA operating parameter information is knowing when a DMA transfer begins or ends, knowing a point in time when each of minor loop iteration transfers begin and end, knowing a point in time when a major loop iteration begins and ends, knowing the periodic status of predetermined DMA channels, and knowing how much latency is associated is associated with each DMA channel request. The DMA debug messages described herein are generated based on existing signals within the DMA controller device 16 and are generated on a real-time basis so that no interruption in the operation of either the DMA controller device 16 or the processor 14 occurs. By having external access to the information which is contained in the DMA messages described herein, an improved level of system-on-chip (SOC) debug, verification and performance can be readily obtained.

In one form there has been provided a system and method of operation thereof having a communication bus and a direct memory access (DMA) device coupled to the communication bus. The direct memory access device controls channels of information, each channel of the channels of information transferring information from a source to a destination in the system via a channel transfer. Debug control circuitry is coupled to the DMA device, the debug control circuitry providing debug messages that identify an existence of a DMA channel transfer boundary for at least one predetermined channel. The debug control circuitry further includes a programmable control mechanism for selecting which of the channels of information controlled by the direct memory access device that the debug messages will identify the existence of channel transfer boundaries. One of the debug messages provided by the debug control circuitry indicates that a channel transfer has started for the at least one predetermined channel. Another of the debug messages further indicates a status parameter of the at least one predetermined channel. In one form the status parameter is one of: (1) channel priority of the at least one predetermined channel; (2) a utilization factor of the at least one predetermined channel; and (3) whether a transfer error has previously occurred in connection with the at least one predetermined channel. In another form one of the debug messages further indicates a time latency associated with the channel transfer indicating system delay between the direct memory access device receiving a request to begin transferring information and actually transferring the information. In yet another form one of the debug messages provided by the debug control circuitry indicates that a channel transfer has ended for the at least one predetermined channel. In another form one of the debug messages provided by the debug control circuitry indicates that each of a plurality of minor loop iterations of the at least one predetermined channel has started. In another form one of the debug messages provided by the debug control circuitry indicates that each of a plurality of minor loop iterations of the at least one predetermined channel has ended. In another form one of the debug messages provided by the debug control circuitry indicates periodic status of the at least one predetermined channel. Alternatively the system may be configured to have a plurality of system units, each of the plurality of system units being coupled to the communication bus. In the alternative form, the debug control circuitry further includes a plurality of debug modules for providing the debug messages, each of the plurality of debug modules being coupled to a predetermined one of the plurality of system units. A debug port logic is coupled to the plurality of debug modules for providing the debug messages to a debug port.

In another form there has been provided a system and method of operation having a communication bus and a direct memory access (DMA) device coupled to the communication bus. The direct memory access device controls channels of information, each channel of the channels of information transfers information from a source to a destination in the system via a channel transfer. Debug control circuitry is coupled to the DMA device, the debug control circuitry providing debug messages that periodically provide at least one status parameter for at least one predetermined channel. In one form the at least one status parameter is at least one of: (1) channel priority of the at least one predetermined channel, (2) a utilization factor of the at least one predetermined channel, and (3) whether a transfer error has previously occurred in connection with the at least one predetermined channel. The debug control circuitry additionally provides debug messages that indicate that a channel transfer has started. The debug control circuitry additionally provides a debug message that indicates that a channel transfer has ended. The debug control circuitry is programmable to enable selective generation of the debug messages for each of the channels of information. The debug control circuitry further generates a watchpoint indicator that is a predetermined watchpoint condition of the at least one predetermined channel, the predetermined watchpoint condition being a watchpoint condition based upon activity of the direct memory access device. The debug control circuitry further generates a plurality of watchpoint indicators, each of which respectively indicates a watchpoint condition of a differing one of the channels of information. A control register stores a control signal that enables and disables the providing of debug messages that periodically provide at least one status parameter for the at least one predetermined channel. The direct memory access device implements nested transfers of information within a same channel comprising a plurality of minor loop iterations that form a major loop iteration. The debug messages each comprise a multiple bit message having predetermined bit fields including a message type field, a channel identification field and a status information field.

In another form there is provided a system and method of operation having a communication bus and a direct memory access (DMA) device coupled to the communication bus. The direct memory access device controls multiple channels of information, each channel of the channels of information transferring information from a source to a destination in the system via a channel transfer. Debug control circuitry is coupled to the DMA device. The debug control circuitry selectively provides debug messages related to operating parameters of the direct memory access device by being programmable on a per channel basis. The operating parameters of the direct memory access device include information regarding at least one of whether a transfer boundary occurred and periodic status information. The debug control circuitry further provides at least one debug message that includes latency information related to system delay of the direct memory access device starting a channel transfer after a channel transfer request is received by the direct memory access device.

It should be apparent that various modifications may be made to the disclosed embodiments. For example, processor 14 may be implemented as any of a variety of differing types of data processing circuits for performing various types of processing functions. Any type of peripheral device may be coupled to processor 102 via the system bus, including coprocessors. The system may be implemented with any of a variety of differing bit sizes. Any type of storage device may be used for the described stores, registers and memories. The order of the fields of the messages may be changed in any manner. The order of the control bits in the control registers may be changed.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

What is claimed is:

1. A system comprising:

a communication bus;

a direct memory access (DMA) device coupled to the communication bus, the direct memory access device controlling multiple channels of information, each channel of the channels of information transferring information from a source to a destination in the system via a channel transfer; and debug control circuitry coupled to the direct memory access device, the debug control circuitry selectively providing debug messages related to operating parameters of the direct memory access device by being programmable on a per channel basis.

2. The system of claim 1 wherein the operating parameters of the direct memory access device comprise information regarding at least one of whether a transfer boundary occurred and periodic status information.

3. The system of claim 1 wherein the debug control circuitry further provides at least one debug message that includes latency information related to system delay of the direct memory access device starting a channel transfer after a channel transfer request is received by the direct memory access device.

4. A method of real-time debug support in a system comprising providing a communication bus;

coupling a direct memory access (DMA) device to the communication bus, the direct memory access device controlling channels of information, each channel of the channels of information transferring information from a source to a destination in the system via a channel transfer;

coupling debug control circuitry to the direct memory access device; and providing debug messages that identify an existence of a DMA channel transfer boundary for at least one predetermined channel of the channels of information.

5. The method of claim 4 further comprising:

programming and selecting which of the channels of information controlled by the direct memory access device that the debug messages will identify the existence of channel transfer boundaries.

6. The method of claim 4 further comprising:

using one of the debug messages provided by the debug control circuitry to indicate that a channel transfer has started for the at least one predetermined channel.

7. The method of claim 6 further comprising:

using the one of the debug messages to further indicate a status parameter of the at least one predetermined channel.

8. The method of claim 7 further comprising:

using the status parameter to indicate one of channel priority of the at least one predetermined channel, a utilization factor of the at least one predetermined channel, and whether a transfer error has previously occurred in connection with the at least one predetermined channel.

9. The method of claim 6 further comprising:

using the one of the debug messages to further indicate a time latency associated with the channel transfer indicating system delay between the direct memory access device receiving a request to begin transferring information and actually transferring the information.

10. The method of claim 4 further comprising:

using the one of the debug messages provided by the debug control circuitry to indicate that a channel transfer has ended for the at least one predetermined channel.

11. The method of claim 4 further comprising:

using the one of the debug messages provided by the debug control circuitry to indicate that each of a plurality of minor loop iterations of the at least one predetermined channel has started.

12. The method of claim 4 further comprising:

using the one of the debug messages provided by the debug control circuitry to indicate that each of a plurality of minor loop iterations of the at least one predetermined channel has ended.

13. The method of claim 4 further comprising:

using the one of the debug messages provided by the debug control circuitry to periodically indicate a predetermined status parameter of the at least one predetermined channel.

14. The method of claim 4 further comprising:

providing a plurality of system units, each of the plurality of system units coupled to the communication bus;

providing a plurality of debug modules for providing the debug messages, each of the plurality of debug modules being coupled to a predetermined one of the plurality of system units; and coupling debug port logic to the plurality of debug modules for providing the debug messages to a debug port.

15. A method of real-time debug support in a system comprising providing a communication bus;

coupling a direct memory access (DMA) device to the communication bus, the direct memory access device controlling multiple channels of information, each channel of the channels of information transferring information from a source to a destination in the system via a channel transfer, and coupling debug control circuitry to the direct memory access a device, the debug control circuitry selectively providing debug messages related to operating parameters of the direct memory access device by being programmable on a per channel basis.

16. The method of claim 15 further comprising implementing the operating parameters of the direct memory access device as information regarding at least one of whether a transfer boundary occurred and periodic status information.

17. The method of claim 15 further comprising providing at least one debug message that includes latency information related to system delay of the direct memory access device starting a channel transfer after a channel transfer request is received by the direct memory access device.

* * * * *

UNITED STATES PATENT AND TRADEMARK OFFICE
CERTIFICATE OF CORRECTION

| | | |
|---|---|---|
| PATENT NO. | : 6,920,586 B1 | Page 1 of 1 |
| APPLICATION NO. | : 10/764110 | |
| DATED | : July 19, 2005 | |
| INVENTOR(S) | : William C. Moyer et al. | |

It is certified that error appears in the above-identified patent and that said Letters Patent is hereby corrected as shown below:

In Column 10, Line 34, Claim No. 1:

Change

"comprising providing a communication bus" to

--comprising:

providing a communication bus;--

In Column 12, Line 17, Claim No. 15:

Change "access a device" to --access device--.

Signed and Sealed this

First Day of May, 2007

JON W. DUDAS
*Director of the United States Patent and Trademark Office*